(12) United States Patent
Holder

(10) Patent No.: US 6,629,002 B1
(45) Date of Patent: Sep. 30, 2003

(54) SEMICONDUCTOR AUTOMATION MARKUP LANGUAGE BASED GEM/SECS DEVELOPMENT APPLICATION

(75) Inventor: Helen A. Holder, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/138,455

(22) Filed: May 3, 2002

(51) Int. Cl.[7] ............................. G06F 19/00; G09G 5/00
(52) U.S. Cl. ........................... 700/96; 700/95; 700/247; 345/700
(58) Field of Search ............................. 700/95, 96, 247; 345/700

(56) References Cited

U.S. PATENT DOCUMENTS 5,991,528 A * 11/1999 Taylor et al. ................. 700/95
6,038,486 A * 3/2000 Saitoh et al. ................. 700/96

OTHER PUBLICATIONS

"Squid Web Proxy Cache" [online] [Retrieved on: Feb. 20, 2002] Retrieved From: http://www.squid-cache.org/.
"Welcome–The Apache Software Foundation" [online] [Retrieved on: Feb. 20, 2002] Retrieved From: http://www.a-pache.org.
"semi.org—The Semiconductor Industry's #1 Bookmark" [online] [Retrieved on: Feb. 18, 2002] Retrieved from: http://www.semi.org/.
"Bluetooth Wireless/How it Works" [online] [Retrieved on: Feb. 18, 2002] Retrieved From: http://www.bluetooth.com/tech/works.asp.
"Nanux::Specialized Link Applications" [online] [Retrieved on: Feb. 25, 2002] Retrieved From: http://www.nanux.com/.

* cited by examiner

Primary Examiner—Albert W. Paladini
Assistant Examiner—W. Russell Swindell

(57) ABSTRACT

A system and method of transmitting instructions to control at least one fabrication machine includes generating a user interface including a series of selectable instructions, selectable machines and at least one graphical input associated with executing selected instructions on at least one selected fabrication machine receiving an indication that the input has been selected, processing the series of selectable instructions using at least one XML schema, transmitting the processed instructions to the at least one fabrication machine, receiving a response from the at least one fabrication machine indicating whether the processed series of selectable instructions have been executed, and generating a second user interface based on the received response.

20 Claims, 3 Drawing Sheets

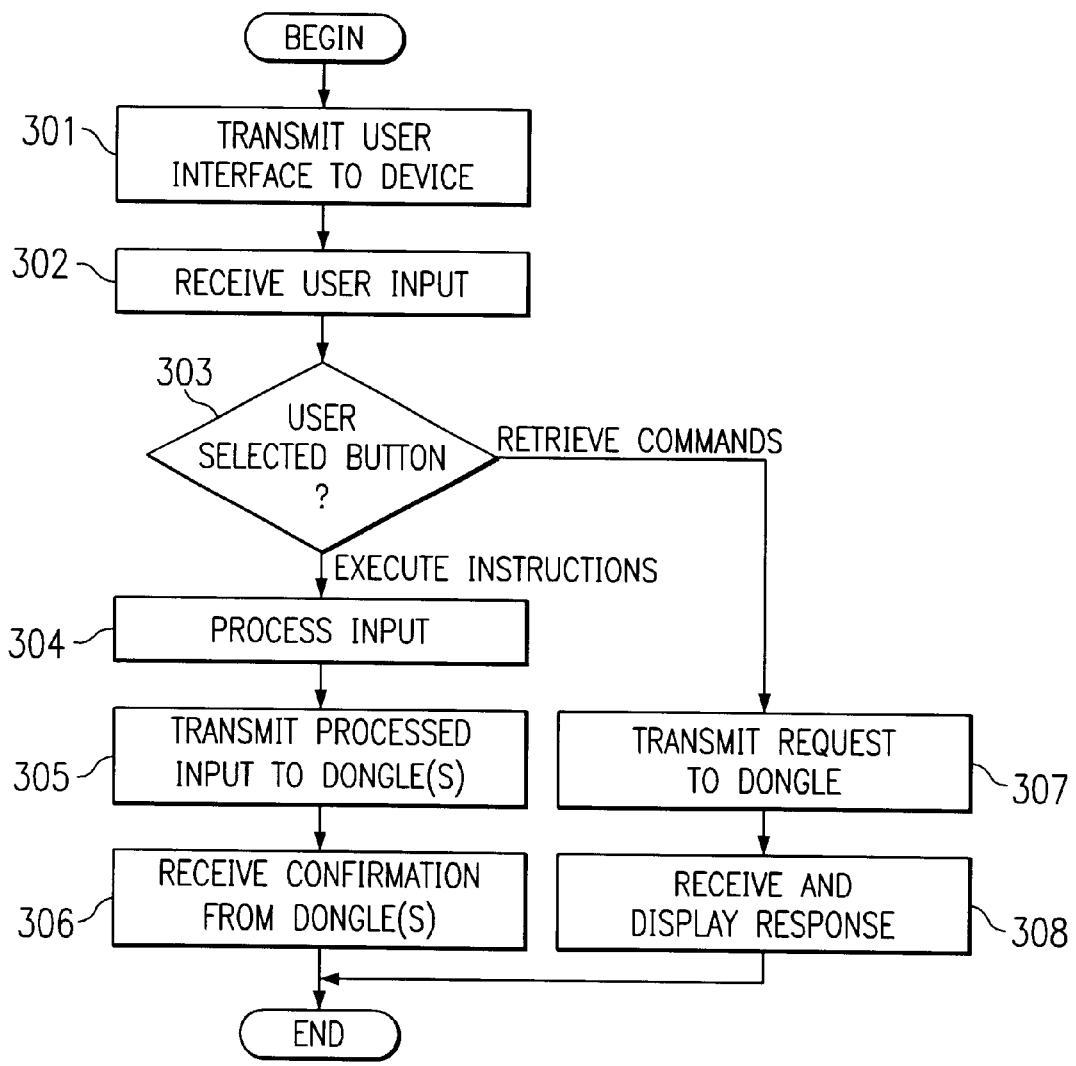

SEMICONDUCTOR AUTOMATION MARKUP LANGUAGE BASED GEM/SECS DEVELOPMENT APPLICATION

RELATED APPLICATIONS

The present application is related to commonly assigned U.S. patent application Ser. No. 10/138,453 entitled "WIRELESS NETWORK ACCESS POINT WITH COMPUTING CAPABILITY AND METHOD OF OPERATION THEREOF," and U.S. patent application Ser. No. 10/138,454 entitled "WIRELESS DONGLE WITH COMPUTING CAPABILITY FOR EQUIPMENT CONTROL AND METHOD OF OPERATION THEREOF," filed on the same date herewith, the disclosures of which are hereby incorporated by reference in their entireties.

FIELD OF THE INVENTION

This invention relates generally to data processing machines and, more particularly, to controlling fabrication machines using markup languages.

BACKGROUND OF THE INVENTION

The process of manufacturing Integrated Circuit (IC) chips may involve multiple steps and many machines. For example, the process may include the steps of deposition, diffusion, metallization, ion implantation and photolithography. Each of these steps may require different machines, such as chemical vapor deposition, dry etch, electron beam lithography, and metal deposition machines, to manufacture IC chips and other silicon devices. Each machine performs a specific step and may be programmed by a machine operator. These fabrication machines may be quite expensive and difficult and/or cumbersome to program.

A machine operator programs or reprograms the machine using an input device that is directly wired to the machine. These input devices may be a personal computer or other input terminal device and monitor. The task of reprogramming machines in a large fabrication plant to perform a different function may require many hours due to the number of machines and the need to individually connect to each machine with an input device. Moreover, reprogramming the machines may require a skilled operator who understands a particular machine programming language. For example, a machine operator may use a specification language, such as GEM/SECS, to reprogram the machine.

GEM/SECS is a specification language developed by the Semiconductor Equipment and Materials International (SEMI) trade association. This specification language details the requirements for IC machines to communication in a GEM/SECS environment. The capabilities provided in a GEM/SECS environment are extensive and allow a machine operator to design, implement, and debug fabrication equipment. More information regarding the GEM/SECS standards may be obtained from SEMI International and on the Internet at http://www.semi.org.

Input devices, such as personal computers, that are connected to fabrication machines, for programming may be connected, for example, via an RS-232 port (e.g., serial port) or other physical connection to the fabrication machine. A machine operator may transmit control commands to the fabrication machine that are then executed on the fabrication machine. The SECS specification language contains low level communication protocols used by the input devices to transfer data and instructions to a physically connected machine.

In some environments, computing devices are interconnected using a Local Area Network (LAN). A LAN may be used to interconnect nodes, such as personal computers, laptops or handheld devices and server platforms. Each node in a LAN may execute programs on its own Central Processing Unit (CPU) and may be able to access data and devices elsewhere on the LAN or, if the LAN is connected to other communication networks, outside the LAN. Users may also use the LAN to communicate with each other, for example, by sending e-mail or engaging in chat sessions. Multiple client nodes may be able to share content located on a file server node, exchange e-mail through a mail server or communicate directly on a peer-to-peer basis.

In addition to client and servers nodes, an access point, such as a router or gateway, may be integrated into the LAN. The router or gateway enables the nodes on the LAN to communicate with remote nodes located outside the LAN, such as web servers. The router uses message headers and a forwarding table to determine where a received packet should go, and uses Internet Control Messaging Protocol (ICMP) to communicate with other routers and determine the best route between any two nodes. Routers are able to communicate with nodes in a fixed networked environment, such as by using Category 5 cabling, or in a wireless networked environment, such as by using high-frequency radio waves that comply with IEEE 802.11 wireless local area network or Bluetooth protocols. For example, routers are able to communicate with wireless capable portable devices, such as computer laptops or other handheld devices. To communicate with the routers in a wireless environment, the portable devices may have a wireless network card, such as a PCMCIA card, to transmit information to and receive information from the router.

XML (eXtensible Markup Language) may be used to define data structures and process information. XML is a markup language that may define data sets relating to web documents. XML is a text-based markup language that uses tags, elements, and attributes to add structure and definition to documents, such as web pages. Tags may be used to mark a section of a document with a formatting command. The tags may enable a developer to indicate the beginning of a new section. Although XML is similar to HTML in syntax and implementation, XML provides enhanced functionality. HTML only allows developers to control how a document may be displayed. In addition to display functionality, XML may allow a description of the actual contents of the documents being displayed (and process the information based on user input) since XML enables developers to create their own collection of tags.

SUMMARY OF THE INVENTION

A system and method of transmitting instructions to control at least one fabrication machine includes generating a user interface including a series of selectable instructions, selectable machines and at least one graphical input associated with executing selected instructions on at least one selected fabrication machine, receiving an indication that the input has been selected, processing the series of selectable instructions using at least one XML schema, transmitting the processed instructions to the at least one fabrication machine, receiving a response from the at least one fabrication machine indicating whether the processed series of selectable instructions have been executed, and generating a second user interface based on the received response.

BRIEF DESCRIPTION OF THE DRAWINGS

FIG. 3 is a flow chart of the steps performed when controlling machines according to one embodiment of the present invention;

DETAILED DESCRIPTION

Figure 1:
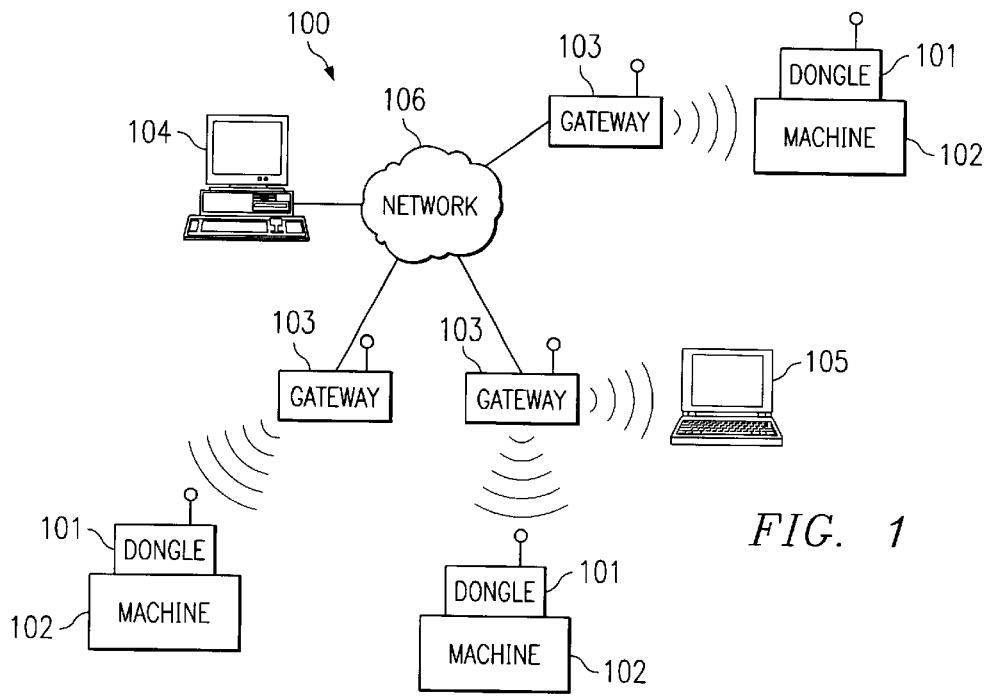
FIG. 1 is a block diagram of a system incorporating one embodiment of the present invention.

Methods, systems, and articles of manufacture consistent with one embodiment of the present invention overcome the shortcomings of manually programming existing fabrication machines by providing a smart gateway having XML schemas to process and send instructions to a fabrication machine. An XML schema is used in XML to describe and constrain the content of an XML document. The smart gateway contains embedded computing capability that processes user information received from a machine operator using a web browser on a client, such as a wireless client or a personal computer. The smart gateway is preferably small and efficient and is housed in a small footprint casing. The smart gateway is capable of managing communication to and from fabrication machines.

The machine operator may use a user interface generated by a web browser to select a set of instructions to transmit to one or more fabrication machines. The interface in the web browser may be created with XML schemas. The machine operator may also use the user interface to obtain status information for a fabrication machine. User information generated from the user interface may be received and transformed into machine control command instructions using a markup language schema and sent to a fabrication machine, via a wireless dongle physically attached to the machine. For example, if a user submits information, it may be transformed into GEM/SEC instructions using an XML schema.

A dongle is a device that attaches to a computer to control access to a particular application. The dongle may process incoming information, such as information received from a smart gateway via a wireless connection, and may pass the processed information to its port connected to a computer or machine. The dongle enables a machine operator to program multiple fabrication machines. Specifically, the dongle contains intelligence that processes instructions received from a device, such as a handheld device or personal computer. The received instructions are converted into control commands and sent to a fabrication machine through an input/output port, such as a parallel port.

The smart gateway may use XML data structures to process user information and to create user interfaces for display in a web browser. For example, an exemplary XML data structure used to transform user input to a GEM/SEC messages may be:

```
<schema targetNamespace="http://www.hp.com/saml"
    xmlns:saml="http://www.hp.com/saml"
    xmlns:xsd="http://www.w3.org/1999/XMLSchema">
<element name="stream" type="saml:streamType"/>
<complexType name="streamType">
    <element name="streamname"  type="xsd:string"/>
    <element name="streamnumber" type="xsd:decimal"/>
    <element name="messagetype" type="saml:messageType"/>
```

-continued

```
</complexType>
<complexType name="messageType">
    <element name="messageNumber" type="xsd:decimal"/>
    <element name="messageName"   type="xsd:string"/>
    <element name="messageAbbrev" type="xsd:string"/>
    </schema>
```

This schema shows direct duplication of the message/data structure of SECS-II. It could also include higher levels of organization, that would enable a user to control a machine's state through the execution of sequential commands. For example, a common sequence of commands may be: (1) establish communications; and (2) obtain status, such as equipment status, material transfer status, or status variable requests. A layer of macro messages may be created with the schema to predefine the most common sequences. These macro sequences may be GEM compliant or may extend beyond GEM to make the user experience much easier.

Using an XML schema to program a fabrication machine provides a number of benefits over traditional methods. First, an XML schema enables a machine operator to easily control multiple machines using XML instead of using complicated GEM/SEC commands. In addition, a control device or a smart gateway may create user interfaces on the fly based on XML schemas to control fabrication machines. In one embodiment, the control device may be a Personal Computer (PC). The control device may control fabrication machines through the smart gateway. Thus, the user interfaces would be consistent for all fabrication machines. The consistent user interface reduces cost and difficulty of operator training and ultimately increases productivity. The user interface may also control safety limits. That is, the user interface created by an XML schema may accept certain data ranges based on the operating specifications of the fabrication machine. Second, XML schemas reduce programming time since by maintaining a database of XML schemas and data requirements for particular fabrication machines, if new machines require new commands, XML schemas reflecting those new commands may be easily updated and stored in a database.

FIG. 1 depicts data processing system 100 suitable for use in one embodiment of the present invention. System 100 comprises a number of devices, such as wireless dongle 101, machine 102, computer 104 and wireless client 105 all electronically connected to smart gateway 103. The devices may be connected to an associated smart gateway 103 in a fixed networked environment or in a wireless networked environment. Machines 102 may be any of well-known semiconductor fabrication machines, such as an chemical vapor deposition machine, dry etch machine or a metal deposition machine. Smart gateway 103 (or computer 104 via smart gateway 103) may communicate with machines 102 using wireless dongle 101 connected to an input/output port (not shown) on machine 102. For example, wireless dongle 101 may be connected to machine 102 through a parallel port.

Wireless device 105 may be a well-known portable personal computer, such as an Hewlett Packard Company (HP) laptop or other handheld device, such as the HP JORNADA handheld and pocket device, available from Hewlett Packard, Inc. Wireless device 105 may also have a wireless network card, such as a PCMCIA card, (not shown) to transmit information to and receive information from smart gateway 103. For example, wireless device 105 may use an HP wireless LAN card. Smart gateway 103 may connect wireless dongle 101 and, ultimately, machine 102 and wireless device 105 to a private or public network, such as a LAN, WAN or Internet 106.

Figure 2:
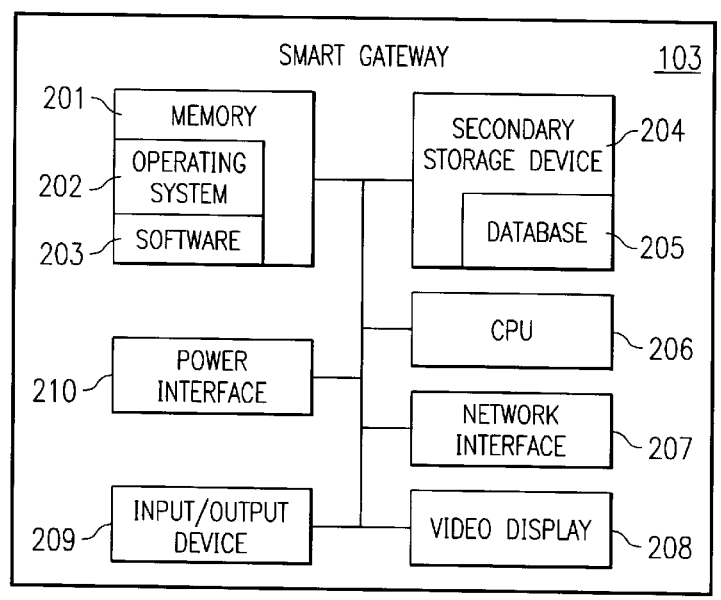
FIG. 2 is a block diagram of a more detailed diagram of the smart gateway according to an embodiment of the invention as depicted in FIG. 1.

FIG. 2 depicts a more detailed view of smart gateway 103, including memory 201, secondary storage device 204, Central Processing Unit (CPU) 206, network interface 207, video display 208, input/output device 209 and power interface 210. Memory 201 stores operating system 202 and software 203. Operating system 202 may serve applications to wireless devices 101. An example of an operating system suitable for use with methods and systems consistent with an embodiment of the present invention is Nanux (a small version of Linux available at http://www.nanux.com) or WINDOWS CE, available from Microsoft, Inc.

Software 203 may include a smart gateway application to configure smart gateway 103 and transmit and receive XML data to and from clients 104, 105 and GEM/SEC instructions to wireless dongle(s) 101 operating in concert with operating system 202. For example, smart gateway 103 may transmit a user interface to wireless device 105. The user interface may contain elements, such as text entry boxes or pull down menus. A machine operator may provide instruction information to the user interface and submit the information to smart gateway 103. Smart gateway 103 may receive the user input from device 104, 105 and transform the user input into GEM/SEC instructions. The messages may then be sent to one or more fabrication machines as ASCII text or binary file, via wireless dongle 101.

Secondary storage device 204 may contain database 205 including information such as user interface information and XML schemas that convert user input into GEM/SEC instructions and that convert GEM/SEC responses received from fabrication machines (e.g., status information) into user interface information. Network interface 207 may be a wired network interface or a wireless network interface to support respective wired and wireless network connections. Power interface 210 may interface with a variety of power sources, such as A.C. power or fuel cell power.

FIG. 3 depicts a flow chart of the steps performed by smart gateway 103 (FIG. 2) when controlling machines. The process is initiated, for example, by transmitting a user interface to client 104, 105 (step 301). The user interfaces may be generated in a web browser (not shown) using an XML schema. For example, the user interface may be a web page including selectable instructions and specified machines to execute the instructions.

Figure 4A:
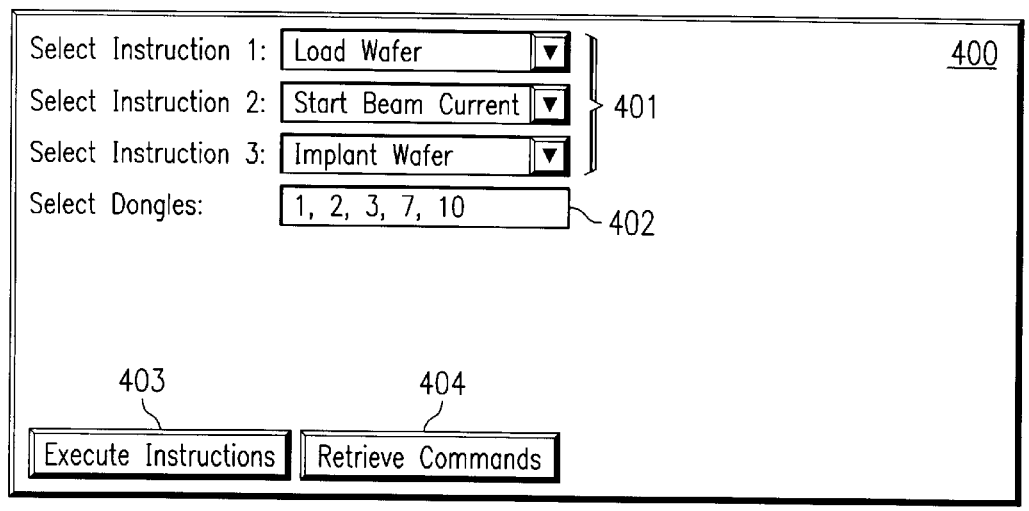
FIG. 4A shows an exemplary screen shot of a display generated in one embodiment of the invention.

FIG. 4A shows an exemplary screen shot of a display generated by the software shown in FIG. 2 in response to step 301. Interface 400 is based on standard browser conventions and may be manipulated using conventional browser interfaces and protocols, such as selection of options using pull-down menus, form navigation using a pointing device, and alphanumeric input using a keyboard. In a "windows" environment, interface 400 may be hidden, closed, or moved to a new location. Interface 400 contains selectable instructions 401 and selectable wireless dongles 402 and buttons at the bottom of user interface 400. The buttons may be used to execute the instructions 403 or retrieve a list of GEM/SEC instructions 404. For example, if the user selects "execute instruction" 403, the selected instructions 401 are processed and transmitted to one or more fabrication machines, via a dongle connected to the machine. If the user selects "retrieve command" 404, a new user interface may be created including a list of GEM/SEC instructions capable of being executed by a fabrication machine.

Once the user has finished selecting instructions to execute and the fabrication machine(s) that will execute the selected instructions, the user may select the "execute instructions" button 403, resulting in the transmission of the user input that is received by smart gateway 103 at step 302 (FIG. 3). Referring to FIG. 3, if the user selects the "execute instructions" button 403 (step 303), then software 203 processes the user input (step 304). For example, smart gateway 103 may transform the received user input from user interface 400 into one or more GEM/SEC instructions based on an associated XML schema. The XML schema may be stored in database 204 (FIG. 2). Once the received user input has been transformed into a GEM/SEC instructions, smart gateway 103 may transmit the GEM/SEC instructions to the selected fabrication machine(s), via dongle(s) 101 (step 305). Once received, the selected fabrication machine may execute the instructions.

If machine 102 is capable of transmitting a response, dongle 101 may receive a response to the transmitted instruction from machine 102 (step 305). For example, the response may include an acknowledgement of the received instruction, an indication that the instruction has been completed, or a list of machine instructions that machine 102 may execute. Dongle 101 may transmit the response to smart gateway 103 and smart gateway 103 may forward the received response as a user interface to devices 104, 105. That is, software 203 may use an XML schema to convert the response into a user interface.

If the user selects "retrieve commands" button 404 of FIG. 4A, (step 303) software 203 may transmit a request for a list of executable instructions to fabrication machine 101 (step 307). Smart gateway 103 may then receive a response from the fabrication machine including a list of instructions machine 101 may execute (step 308). Smart gateway 103 may also store these instructions as part of an XML schema in database 203 for future reference.

Figure 4B:
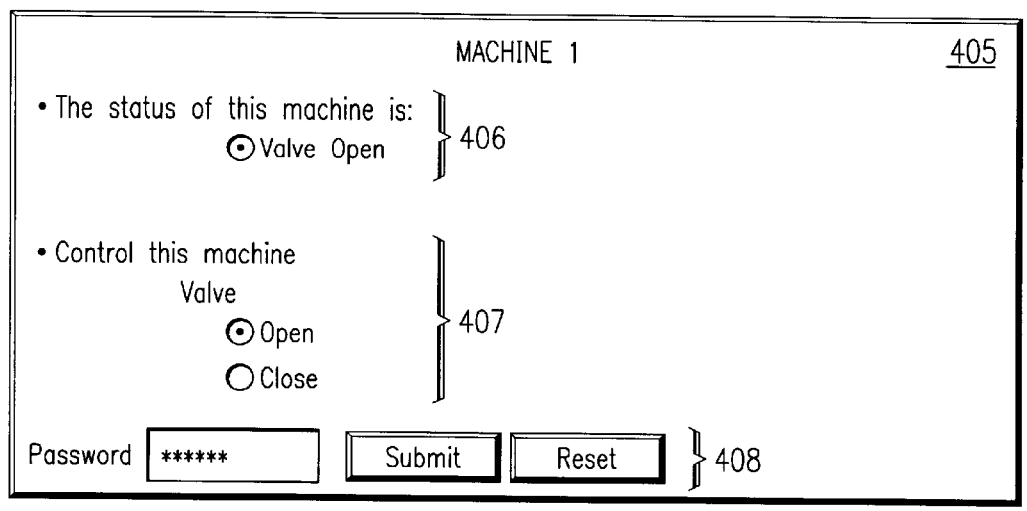
FIG. 4B shows a second exemplary screen shot of a display generated in an alternative embodiment of the invention.

FIG. 4B shows a second exemplary screen shot of a display generated by the software shown in FIG. 2. Interface 405 is based on standard browser conventions and may be manipulated similarly as interface 400. Interface 405 contains real-time status information 406 and programmable instruction information 407 based on the real-time status information. For example, using programmable instruction information 407, a machine operator may select whether the indicated valve on "Machine 1" should be open or closed. Once the machine operator selects the correct valve setting, the machine operator may enter a password and select the submit button 408. Once the submit button is selected, software 203 receives the submitted information and transforms the information into a GEM/SEC instruction. Software 203 may transform the information using an XML schema stored in database 205. Software 203 may also transmit the GEM/SEC instruction to the appropriate fabrication machine via a wireless dongle.

What is claimed is:

1. A method of transmitting instructions to control at least one fabrication machine comprising:

generating a user interface including a series of selectable instructions, selectable machines and ant least one graphical input associated with executing selected instructions on at least one fabrication machine;

receiving an indication that the input has been selected;

processing the series of selectable instructions using at least one XML schema;

transmitting the processed instructions to the at least one fabrication machine;

receiving a response from the at least one fabrication machine indicating whether the processed series of selectable instructions have been executed; and generating a second user interface based on the received response.

2. The method of claim 1 wherein the step of processing the series of selectable instructions further comprises:

transforming the selected instructions into machine control command language instructions based on a schema stored in a database; and wherein the step of transmitting the processed instructions further comprises:

transmitting the processed instructions to at least one dongle physically attached to the at least one fabrication machine.

3. The method of claim 1 further comprising:

storing a translation table for converting the processed user input to machine control command language.

4. The method of claim 2 further comprising:

receiving the machine control command language instructions at a fabrication machine; and executing the machine control command language instructions on the fabrication machine.

5. The method of claim 2 wherein transmitting the processed instructions to the at least one fabrication machine further comprises:

transmitting the machine control command instructions to a wireless dongle using a wireless network.

6. A method for providing instructions to a fabrication machine, comprising:

displaying a user interface that includes at least one selectable instruction, wherein the user interface is generated by a markup language schema;

receiving user input including a set of selected instructions to execute on a fabrication machine;

transforming the user input into at least one fabrication machine instruction using the markup language schema; and transmitting the at least one fabrication machine instruction to a device physically connected to the fabrication machine.

7. The method of claim 6 wherein transforming the user input further comprises:

locating, in a database, a markup language schema associated with the user input; and replicating fabrication machine instructions based on the user input.

8. The method of claim 6 further comprising:

receiving a confirmation from the device indicating whether the instruction has been executed by the fabrication machine;

transforming the confirmation using the markup language schema into a suitable markup language; and displaying the transformed confirmation to the user.

9. The method of claim 6 further comprising:

receiving user input including a request for available instructions on a machine;

transforming the user input into at least one fabrication machine instruction using a markup language schema;

transmitting the at least one fabrication machine instruction to a device physically connected to a fabrication machine; and receiving a response to the request indicating a list of instructions that the fabrication machine is capable of executing.

10. The method of claim 6 further comprising:

transmitting real-time status information and programmable instruction information related to a machine to a user interface device;

receiving user input from the user interface device based on the real-time status information;

transforming the user input into a fabrication machine instruction using a markup language schema; and transmitting the fabrication machine instruction to a fabrication machine associated with the real-time status information.

11. A system for transmitting instructions to control at least one fabrication machine comprising:

generating means for generating a user interface including selectable instructions, selectable machines and at least one graphical input associated with executing selected instructions on selected machines including the at least one fabrication machine;

receiving means for receiving an indication that the input has been selected;

processing means for processing the series of selectable instructions using at least one XML schema;

transmitting means for transmitting the processed instructions to the at least one fabrication machine;

receiving means for receiving a response from the at least one fabrication machine indicating whether the processed series of selectable instructions have been executed; and generating means for generating a second user interface based on the received response.

12. The system of claim 11 wherein the processing means further comprises:

means for transforming the selected instructions into machine control command language instructions based on a schema stored in a database; and wherein the transmitting means further comprises:

means for transmitting the processed instructions to at least one dongle physically attached to the selectable machines.

13. The system of claim 11 further comprising:

storing means for storing a translation table for converting the processed user input to machine control command language.

14. The system of claim 12 further comprising:

receiving means for receiving the machine control command language instructions in a fabrication machine; and executing means for executing the machine control command language instructions on the fabrication machine.

15. The system of claim 12 wherein the transmitting means further comprises:

means for transmitting the machine control command instructions to a wireless dongle using a wireless network.

16. A smart gateway in communication with a plurality of devices that provide instructions to fabrication machines, the smart gateway comprising:

a transmitter for transmitting a user interface to a first device, wherein the user interface includes at least one selectable instruction, and wherein the user interface is generated by a markup language schema and includes information associated with fabrication machine instructions and transmitting fabrication machine instruction to a second device physically connected to a fabrication machine;

a receiver for receiving user input from the first device, wherein the user input includes a set of selected instruction to execute on the fabrication machine; and a processor connected to a memory for storing instructions, said processor responsive to said instructions to transform the user input using into at least one fabrication machine instruction using the markup language schema.

17. The gateway of claim 16 further comprising:

a database including a markup language schema associated with the user input; and wherein the processor is further responsive to said instructions to locate, in the database, the markup language schema associated with the user input, and to replicate fabrication machine instructions based on the user input.

18. The gateway of claim 16 wherein:

the receiver further receives a confirmation from the second device indicating whether the instruction has been executed by the machine; and wherein the processor is further responsive to said instructions to transform the confirmation using the markup language schema into a suitable markup language; and the transmitter further transmits the transformed conformation to the first device.

19. The gateway of claim 16 wherein:

the receiver further receives user input from the first device, wherein the user input includes a request for available instructions on a machine, the processor is further responsive to said instructions to transform the user input using into at least one fabrication machine instruction using a markup language schema, and wherein the transmitter further transmits the at least one fabrication machine instruction to a second device physically connected to a fabrication machine; and the receiver further receives a response to the request indicating a list of instructions that the fabrication machine is capable of executing.

20. The gateway of claim 16 wherein:

the transmitter further transmits real-time status information and programmable instruction information related to a machine to the device;

the receiver further receives user input from the first device based on the real-time status information;

the processor is further responsive to said instructions to transform the user input into a GEM/SEC instruction using an XML schema; and the transmitter further transmits transmitting the GEM/SEC instruction to a fabrication machine associated with the real-time status information.

* * * * *